United States Patent [19]

Hellekson et al.

[11] Patent Number: 4,861,973
[45] Date of Patent: Aug. 29, 1989

[54] OPTICAL SCAN PATTERN GENERATING ARRANGEMENT FOR A LASER SCANNER

[75] Inventors: Ronald A. Hellekson, Eugene, Oreg.; John S. Campbell, Palo Alto, Calif.; Jorge L. Acosta, Eugene, Oreg.

[73] Assignee: Spectra-Physics, Inc., San Jose, Calif.

[21] Appl. No.: 64,317

[22] Filed: Jun. 18, 1987

[51] Int. Cl.$^4$ .............................................. G06K 7/10
[52] U.S. Cl. ..................................... 235/467; 235/470
[58] Field of Search ................................. 235/467, 470

[56] References Cited

U.S. PATENT DOCUMENTS 4,713,532  12/1987  Knowles ............................. 235/467

Primary Examiner—Harold I. Pitts
Attorney, Agent, or Firm—Killworth, Gottman, Hagan & Schaeff

[57] ABSTRACT

An optical arrangement in a laser scanner for generating a cross bar X laser light beam scan pattern includes a multi-faceted or -mirrored optical device mounted for rotation about a vertical axis. The device has four primary mirrors oriented ninety degrees from one to the next about the vertical axis. The primary mirrors are tilted about respective horizontal axes relative to the vertical axis and adapted to receive and reflect a laser light beam as each primary mirror moves successively through a portion of each rotational cycle of the optical device. The optical arrangement also includes a multiplicity of secondary mirrors disposed in stationary positions relative to one another and to each of the primary mirrors as they move successively through the rotational cycle portion. The secondary mirrors are adapted to receive the laser light beam reflected from the primary mirrors and to reflect the same to trace scan lines of the laser light beam scan pattern at different orientations with respect to one another as the primary mirrors move successively through the portion of each rotational cycle.

18 Claims, 8 Drawing Sheets

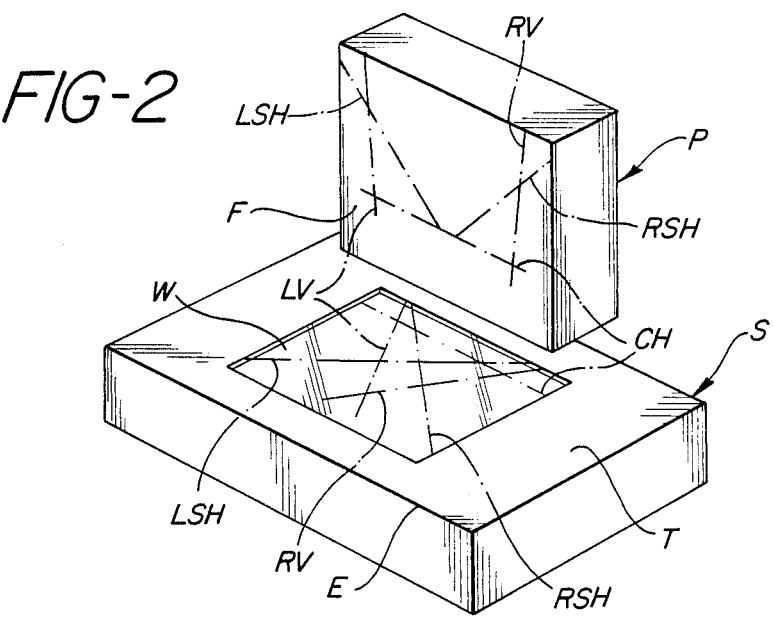
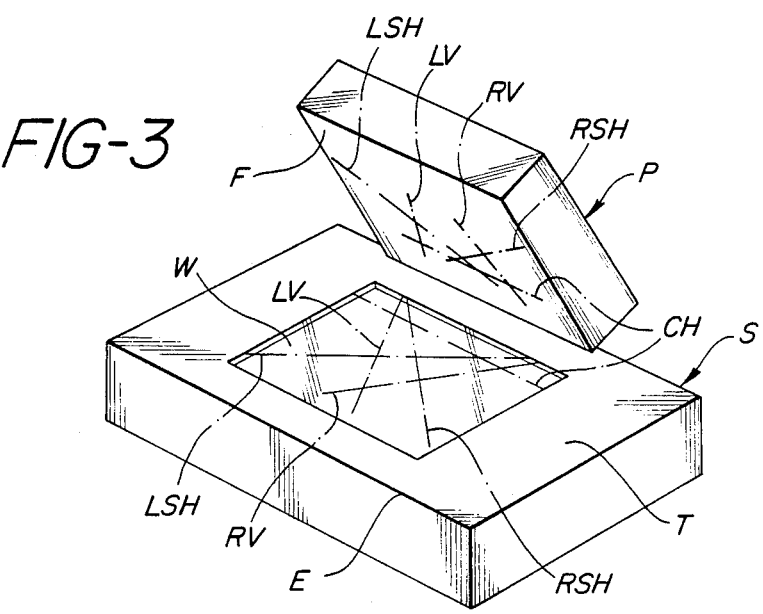

OPTICAL SCAN PATTERN GENERATING ARRANGEMENT FOR A LASER SCANNER

BACKGROUND OF THE INVENTION

The present invention generally relates to laser instruments and, more particularly, to an optical arrangement in a laser scanner for generating a scan pattern to find and read a bar code which is spaced from the scanner, such as a package label carrying a bar code symbol, wherein enhanced compactness of the optical arrangement minimizes the overall vertical height of the laser scanner.

Bar code symbols are used on a broad range of retail packages for check-out and inventory purposes and a variety of laser scanners have been designed to read such symbols. Little attention has been paid to the physical size of these laser scanners. Instead, the ability to provide high performance scanning has been emphasized without any concern for how tall or large the scanner unit might be. With this latitude in design available to manufacturers, some laser scanners have been made that are as much as 75 cm tall. This lack of emphasis on scanner height has prevented using scanners in some applications where appearance and counter space are important.

Up to the present time, the primary design limitation with respect to overall scanner size has been the space requirements of the various scanner components. It has not previously been possible to include the transmission optics, the collection optics, and the geometry of the scan pattern and the optical components, i.e. mirrors, that create this pattern, into a sufficiently shallow vertical height scanner. One laser scanner has been designed and introduced heretofore by the assignee of the present invention specifically to meet the requirements of reading bar code labels at package speeds up to 100 inches per second in an overall scanner size less than 13 cm tall.

This laser scanner utilizes a retro-directive optical system composed of transmission optics, collection optics and a scan pattern generating arrangement. The transmission optics include a low power He-Ne laser, two small routing mirrors, a diverging lens on the end of the laser, and a focusing lens that is molded as part of a larger collection lens of the collection optics. The basic function of the transmission optics is to create and transmit a focused laser spot, of the correct diameter, at the plane of the package label to illuminate the bars and spaces of a bar code symbol on the label.

The collection optics of this prior art scanner includes a collection lens, a bandpass filter and a photodetector. The basic function of the collection optics is to gather and collect only the diffuse laser light reflected from the label and focus it onto a small detector. The light is collected and focused in such a way as to optimize the signal-to-noise ratio. In the retro-directive optical system of the scanner, a cone of light returning from the label and surrounding the beam of light being transmitted to the label is collected by the collection lens. In this way, a substantial portion of ambient light is eliminated from the system. Additional filtering of ambient light "noise" is achieved by the bandpass filter.

The basic requirement for grocery and other high volume transaction laser scanners is to operate in a way that the store check-out clerk does not have to worry about the label orientation as the product label is passed over the scanner. Pursuant to that requirement, the scan pattern generating arrangement of the prior art laser scanner has employed a multi-faceted mirror assembly consisting of high reflectivity mirror surfaces which spin about a generally horizontal axis. The basic function of the scan pattern generating arrangement is to move the beam of laser light through a three dimensional pattern capable of finding and reading labels in as many orientations as possible.

Although the Model 750 SL laser scanner has provided a high performance, low profile POS scanner design which has met and surpassed European market requirements, it is perceived that further improvements in performance and reduction in scanner height are desired to satisfy the continuing demand for high performance, low cost scanners in specific applications.

SUMMARY OF THE INVENTION

The present invention provides an optical scan pattern generating arrangement in a laser scanner designed to satisfy the aforementioned needs. The optical components of the scan pattern generating arrangement enhance the overall compactness of the scanner so as to further reduce the overall vertical height thereof over that of the prior art Model 750 SL scanner. It is highly desirable in retrofitting POS check-out stations with this type of scanner for the scanner to have the smallest height attainable, while preserving its low cost and reliability, in order to provide flexibility in the way the scanner is installed. A scanner of reduced overall dimensions permits many variations in mounting arrangements and mounting locations which are not possible with a larger scanner.

Therefore, the present invention is directed to an optical arrangement in a laser scanner of reduced height for generating a laser light beam scan pattern. The scan pattern generating arrangement comprises an optical device mounted for movement repetitively through a rotational cycle about a generally upright axis and having a plurality of primary reflective elements in the form of mirrors oriented in angularly displaced relation from one to the next about the upright axis, means for rotatably moving the optical device about the upright axis, and a multiplicity of secondary reflective elements also in the form of mirrors being disposed in stationary positions relative to one another and to each of the primary mirrors of the optical device as the primary mirror moves through a portion of each rotational cycle. Each primary mirror is adapted to receive and reflect a laser light beam as the primary mirrors move successively through the portion of each rotational cycle of the optical device. The secondary mirrors are adapted to receive the laser light beam reflected from the primary mirrors and to reflect the same to trace scan lines of the laser light beam scan pattern at different orientations with respect to one another as the primary mirrors move successively through the rotational cycle portion. Additionally, the primary mirrors of the optical device are tilted relative to the upright axis so as to be spaced closer to one another at their respective upper ends than at their respective lower ends.

More particularly, the laser light beam scan pattern generated by the optical arrangement is a cross bar X scan pattern. The multiplicity of secondary mirrors includes first, second and third pluralities of the secondary mirrors. The secondary mirrors in the first plurality thereof are adapted to trace a pair of spaced apart side horizontal scan lines of the cross bar X laser light beam scan pattern as the primary mirrors move successively through the rotational cycle portion. Specifically, the secondary mirrors in the first plurality include a pair of upper and lower secondary mirrors disposed forwardly of and laterally outward from each of a pair of opposite sides of the optical device. Each primary mirror at an initial segment of each rotational cycle portion reflects the laser light beam to one of the pairs of upper and lower secondary mirrors to provide one of the side horizontal scan lines and at a final segment of the rotational cycle portion reflects the laser light beam to the other of the pairs of upper and lower secondary mirrors to provide the other of the side horizontal scan lines. More specifically, each primary mirror at the initial segment of each rotational cycle portion reflects the laser light beam to the upper one of the one pair of secondary mirrors wherefrom the laser light beam is reflected to the lower one of the one pair and at the final segment of the rotational cycle portion reflects the laser light beam to the upper one of the other pair of secondary mirrors wherefrom the laser light beam is reflected to the lower one of the other pair.

The secondary mirrors of the second plurality thereof are adapted to trace a pair of spaced apart vertical scan lines of the cross bar X laser light beam scan pattern as the primary mirrors move successively through the rotational cycle portion. Specifically, the secondary mirrors of the second plurality include an upper central secondary mirror disposed forwardly of the optical device, and a pair of outer secondary mirrors each being disposed forwardly of and laterally outward from one of a pair of opposite sides of the optical device and adjacent to and extending generally below one of a pair of opposite end portions of the central secondary mirror. Each primary mirror at an initial segment of each rotational cycle portion reflects the laser light beam to one of the end portions of the central secondary mirror wherefrom the laser light beam is reflected to one of the pair of outer secondary mirrors to provide one of the vertical scan lines and at a final segment of each rotational cycle portion reflects the laser light beam to the other of the end portions of the central secondary mirror wherefrom the laser light beam is reflected to the other of the pair of outer secondary mirrors to provide the other of the vertical scan lines.

Finally, the secondary mirrors of the third plurality thereof are adapted to trace a center horizontal scan line of the cross bar X laser light beam scan pattern as the primary mirrors move successively through the rotational cycle portion. Specifically, the secondary mirrors in the third plurality include the upper central secondary mirror of the second plurality of secondary mirrors, and a lower central secondary mirror spaced between and below the upper central secondary mirror and the optical device. Each primary mirror at a middle segment of each rotational cycle portion reflects the laser light beam to the upper central secondary mirror wherefrom the laser light beam is reflected to the lower central secondary mirror to provide the central horizontal scan line.

Accordingly, it is an object of the present invention to provide a laser scanner incorporating a laser light beam scan pattern generating arrangement which minimizes the overall height of the laser scanner; to provide a laser light beam scan pattern generating arrangement which utilizes a multi-mirrored optical device rotatably about a generally vertical axis; to provide the mirrors of the optical device in angularly displaced orientations about the vertical axis and tilted with respect thereto about horizontal axes; and to provide a multiplicity of mirrors stationarily positioned relative to one another and to the successive mirrors of the rotatable optical device to trace the basic scan lines of the scan pattern in different orientations with respect to one another so as to generate a cross bar X scan pattern.

BRIEF DESCRIPTION OF THE DRAWINGS

FIG. 2 is a perspective view of the laser scanner and a package disposed above the scanner and parallel to the front edge thereof and in a vertical position wherein a cross bar X scan pattern is projected on the scanner window and on the package face.

FIGS. 3–5 are perspective views similar to that of FIG. 2 but showing the cross bar X scan pattern on a package disposed at different orientations with respect to the laser scanner.

DETAILED DESCRIPTION OF THE PREFERRED EMBODIMENT

Figure 1:
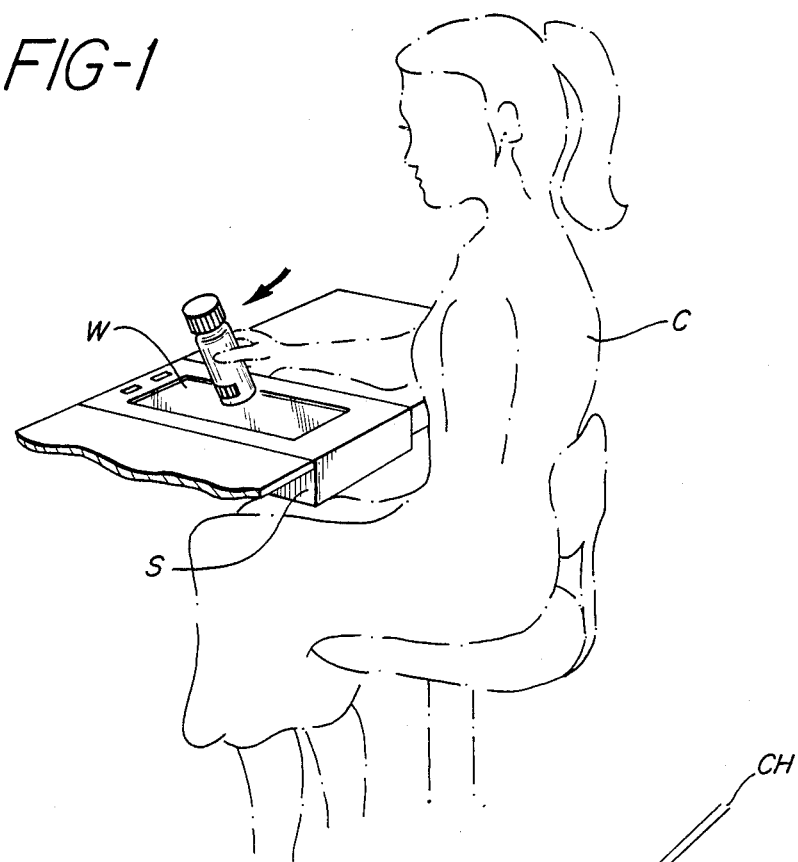
FIG. 1 is a pictorial view of a sales clerk at a checkout counter sweeping a product carrying a bar code label across the window of a laser scanner.

FIG. 1 is a pictorial view of a sales clerk C at a checkout counter, with a laser scanner S being used to scan a product label. The clerk C manually passes the product over a window W from which the scanning beam emerges so as to permit the beam to be swept across the label. A portion of the light reflected from the label passes downward from the arrangement of bars on the product label. The beam is caused to rapidly sweep through a series of scan paths which collectively produce a scan pattern in which the likelihood of a successful scan is high. The scan pattern should be such that it is highly probable that at least one scan path will traverse the label in a direction more or less perpendicular to the bars.

In common with many scanners in use today, the present invention uses a variation of what can be called a "cross bar X" scan pattern. FIG. 2 herein illustrates this scan pattern on a window W of the scanner S and on a face F of package P, bearing a bar code label (not shown), disposed parallel to the front edge E of the scanner S and in a vertical position. The cross bar X pattern consists of five basic scan lines: the center horizontal (CH) line, right and left side horizontal (RSH & LSH) lines, and right and left vertical (RV & LV) lines. Note the orthogonality of the RV and LV scan lines with the CH scan lines.

Figure 4:
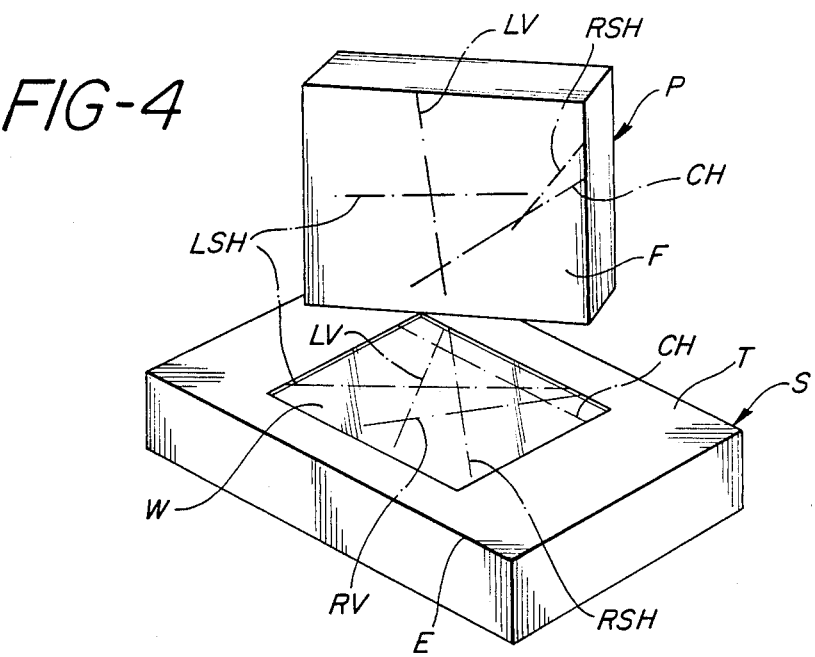
Figure 5:
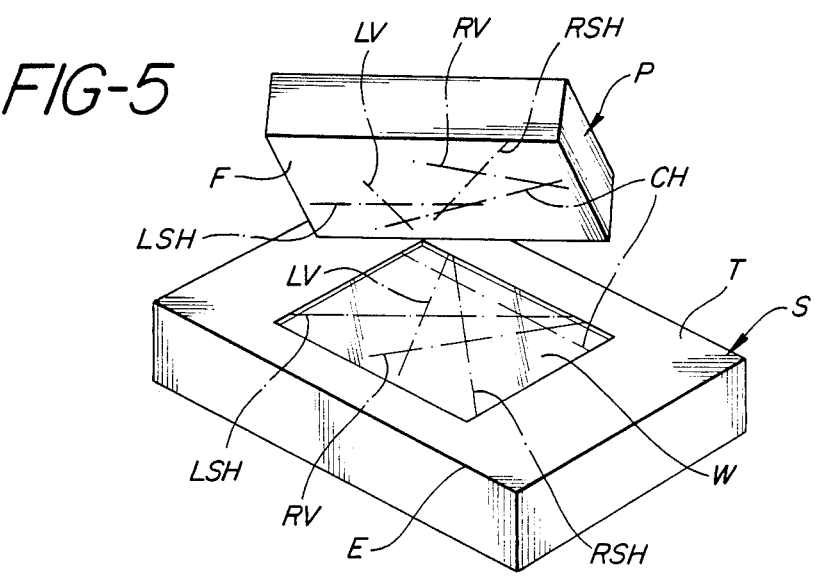
Figure 6:
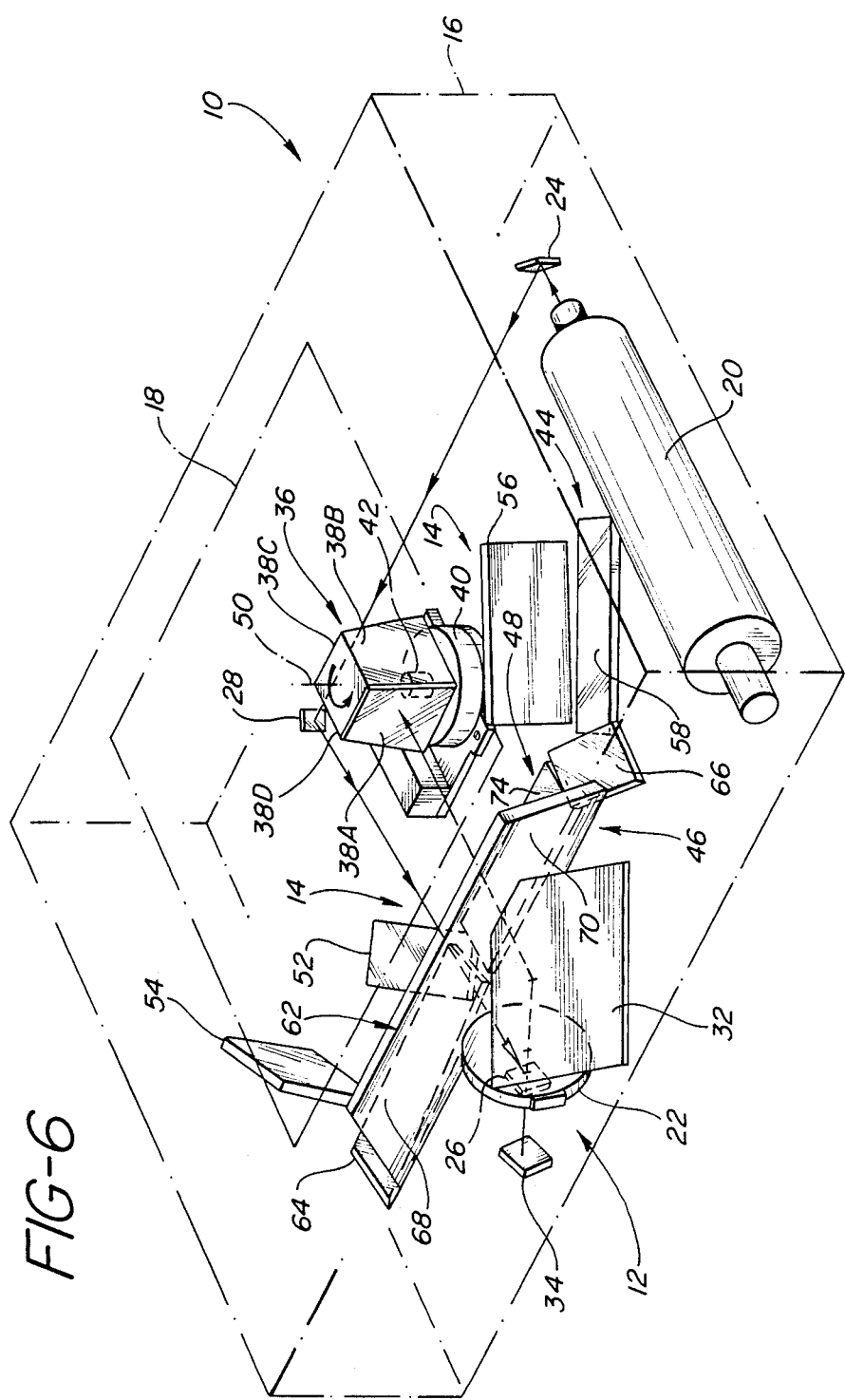
FIG. 6 is a schematic perspective view of a laser scanner incorporating the optical arrangement of the present invention for generating a cross bar X scan pattern.
Figure 7:
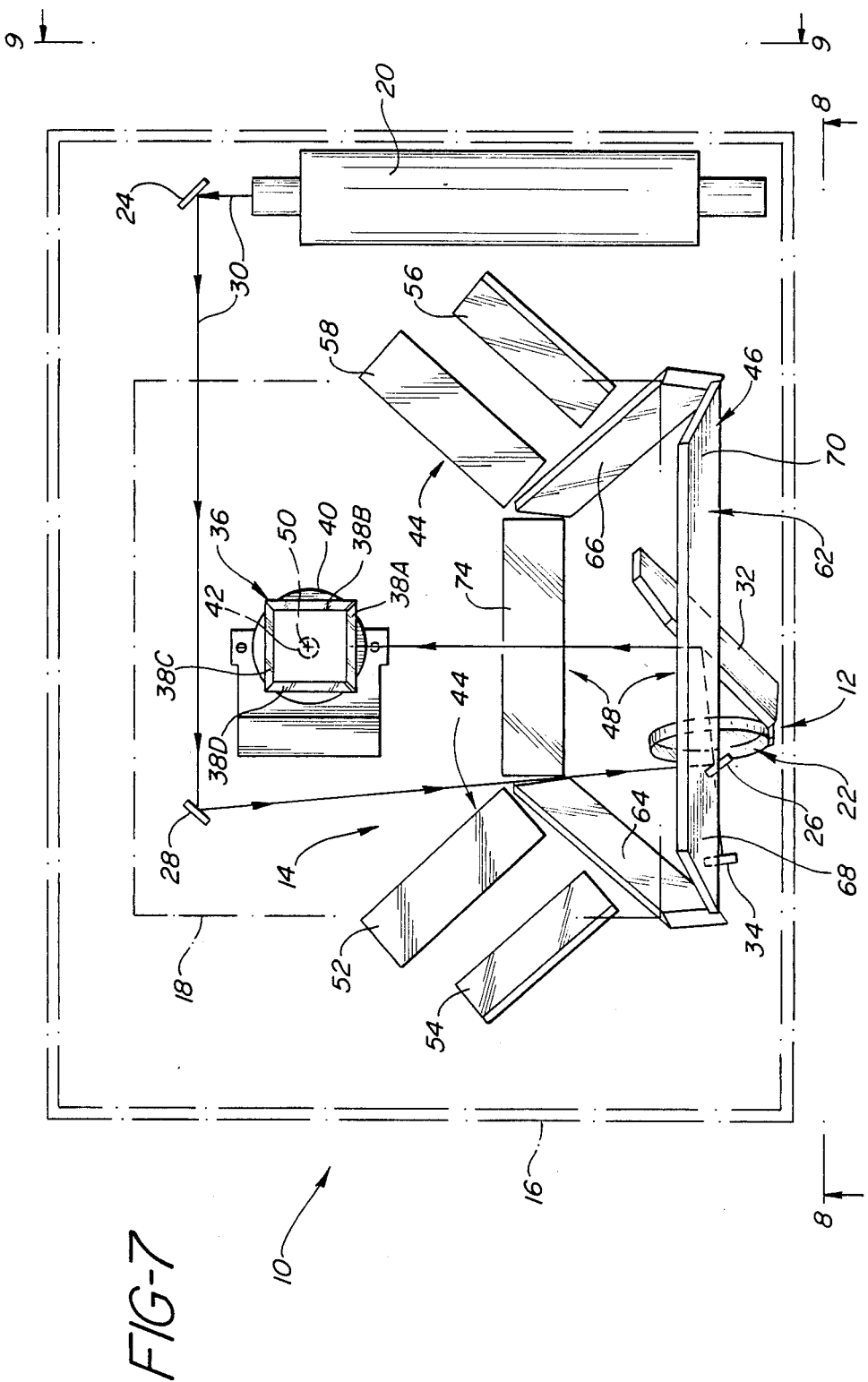
FIG. 7 is a schematic top plan view of the scanner of FIG. 6.
Figure 8:
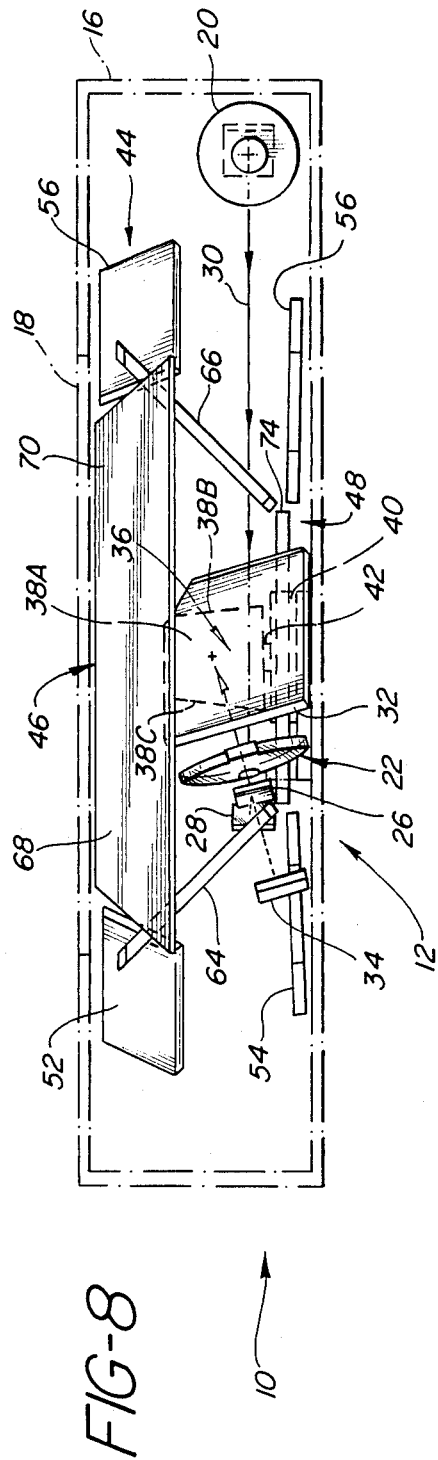
FIG. 8 is a schematic front elevational view of the scanner as seen along line 8—8 of FIG. 7.
Figure 9:
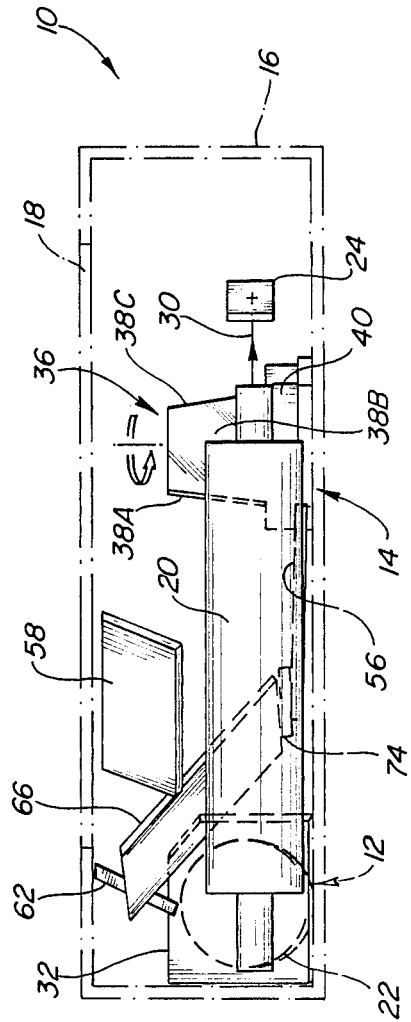
FIG. 9 is a schematic side elevational view of the scanner as seen along line 9—9 of FIG. 7.

A more intuitive understanding of this scan pattern can be gained by examining depictions of the scan pattern on the package P in different orientations, as shown in FIGS. 3-5. In FIG. 3, the package face F is disposed parallel to the front edge E of the scanner S but leaned forty-five degrees toward the top T of the scanner. Note the orthogonality of the RV and RSH scan lines. In FIG. 4, the package face F is disposed in a vertical position but rotated forty-five degrees from the front edge E of the scanner S. Note the orthogonality of the LV and LSH scan lines. In FIG. 5, the package face F is rotated forty-five degrees from the front edge E of the scanner S and leaned forty-five degrees toward the top T of the scanner. Note the orthogonality of the LV and CH scan lines. In each of FIGS. 2-5, there is at least one set of perpendicularly crossing scan lines even though the label planes are at very different locations. The cross bar X scan pattern thus ensures that a set of perpendicular lines will cross a label.

Reference is now made to FIGS. 6-9 of the drawings which illustrate a laser scanner 10 having a retro-directive optical system which includes laser light transmission and collection optics 12 and the optical arrangement 14 of the present invention for generating a scan pattern, such as the cross bar X scan pattern, to find and read a spaced target (not shown), such as a package label carrying a bar code symbol. The transmission and collection optics 12 and the optical arrangement 14 are enclosed in a housing 16 having an upper transparent window 18 in the top thereof. The configuration and compactness of the optical arrangement 14 minimizes the overall vertical height of the laser scanner 10.

The transmission and collection optics 12 of the laser scanner 10 include a laser source 20, for instance a helium-neon laser tube which produces a laser beam of red light at 632.8 nanometers (nm). Of course other types of laser sources can be used. Optics 12 also includes a lens assembly 22 and three small mirrors 24-28 located respectively adjacent the output of the laser source 20, adjacent one side of the lens assembly 22 and intermediately therebetween for reflectively routing the laser light beam 30 from the laser source 20 to the lens assembly 22. The laser beam 30 emerges from the opposite side of the lens assembly 22 and is reflected by another mirror 32 oriented at approximately forty-five degrees to the beam path. The mirror 32 directs the laser beam 30 toward the optical arrangement 14 for generating the scan pattern for reading the target, as will be described in detail below. Light reflected back from the target along the same path via the optical arrangement 14 to the lens assembly 22 is collected and focused on a photodetector 34. Since optics 12 does not form any part of the present invention, further description thereof is not necessary herein for gaining a clear understanding of the present invention.

The optical arrangement 14 of the laser scanner 10 for generating the cross bar X laser light beam scan pattern in accordance with the principles of the present invention basically includes a multi-faceted optical device 36 having multiple primary mirrors 38A-D, drive means in the form a motor 40 having a rotatable output shaft 42 mounting the optical device 36, and first, second and third pluralities of stationarily-disposed secondary mirrors 44-48. The motor 40 mounts the optical device 36 for rotational movement through a repetitive cycle about a generally vertical axis 50. The primary mirrors 38A-D are oriented in angularly displaced relation, preferably ninety degrees, from one to the next about the vertical axis 50 such that the device 36 has a generally square cross-sectional configuration. However, the primary mirrors 38A-D are tilted about respective horizontal axes relative to the vertical axis 50 so as to create an optimum scan pattern. Although four mirrors 38A-D are illustrated, it will be appreciated that a different number of mirrors may be utilized in a scanner according to the present invention, such as for example two, three or five mirrors.

Each primary mirror 38A-D is adapted to reflect the laser light beam 30 received from the mirror 32 of the transmission and collection optics 14 as the primary mirrors move successively through a portion of each rotational cycle of the optical device 36. The rotational cycle portion is equal to approximately 90 degrees. As each one of the primary mirrors receives the laser beam 30 from the mirror 32, it sweeps the laser beam 30 across all of the mirrors in the first to third pluralities 44-48 thereof.

The secondary mirrors in first plurality 44 thereof include right and left pairs of upper and lower secondary mirrors 52,54 and 56,58 disposed forwardly of and laterally outward from each of a pair of opposite sides of the optical device 36. The upper secondary mirrors 54,56 are oriented at about thirty degrees with respect to vertical, whereas the lower secondary mirrors 52,58 are oriented in a horizontal plane. Further, the upper secondary mirrors 54,56 are located substantially above the optical device 36, whereas the lower secondary mirrors 52,58 are located below it.

Figure 10:
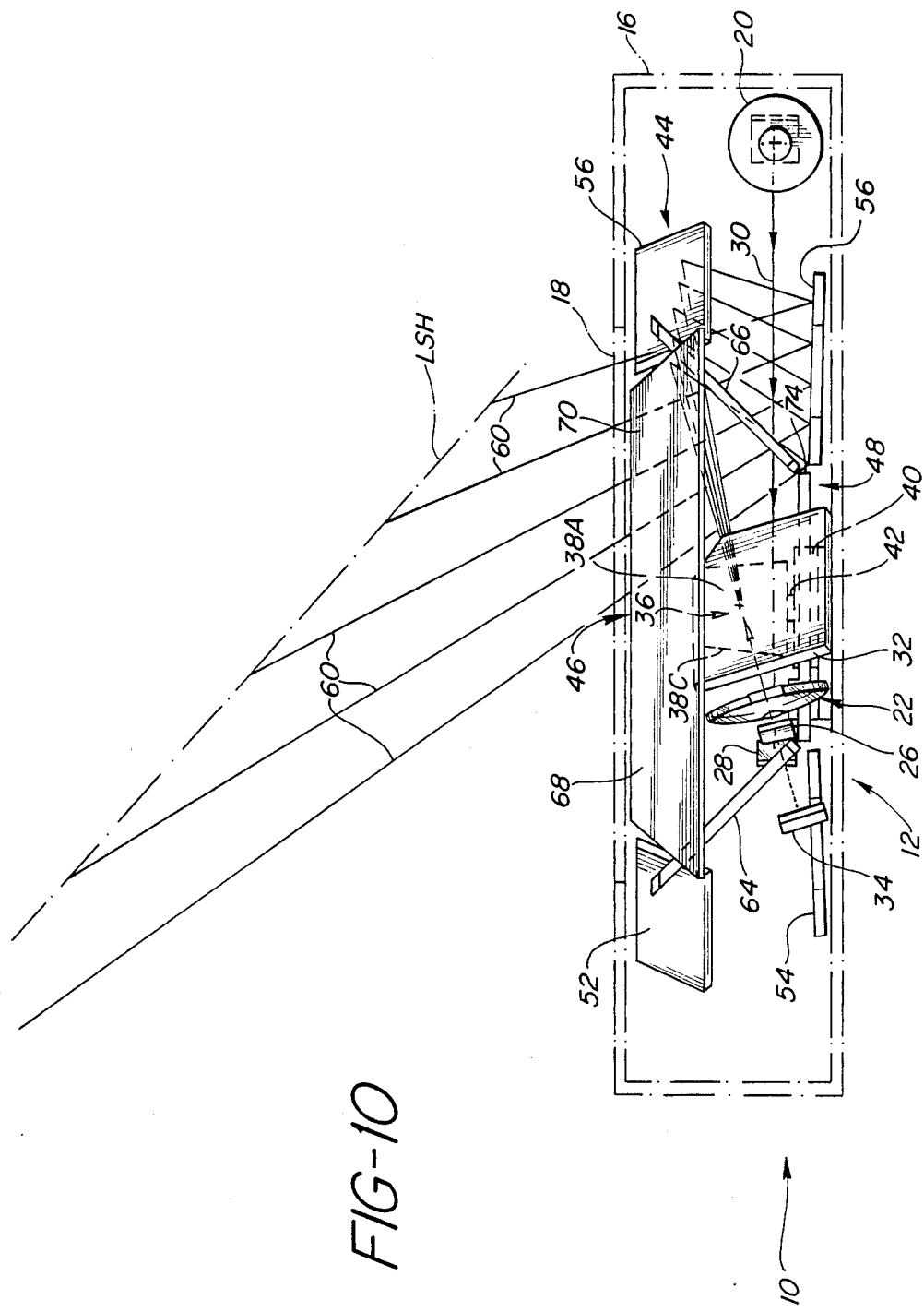
FIG. 10 is a schematic front elevational view similar to that of FIG. 8 also showing generation of side horizontal scan lines of the cross bar X pattern.

As shown in FIG. 10, the right and left pairs of upper and lower secondary mirrors 52,54 and 56,58 of the first plurality 44 thereof are adapted to receive the laser light beam 30 reflected from each of the primary mirrors 38A-D and to reflect the same along V-shaped laser light beam path 60 through the upper window 18 of the scanner housing 16 to trace the pair of spaced apart right and left side horizontal (RSH & LSH) scan lines of the cross bar X laser light beam scan pattern as the primary mirrors 38A-D move successively through the aforementioned portion of each rotational cycle of the optical device 36. Only generation of the LSH scan line by the left pair of upper and lower secondary mirror 56,58 is depicted in FIG. 10.

More particularly, each primary mirror 38A-D at an initial small angular segment of the half-cycle portion of each rotational cycle of the optical device 36 reflects the laser light beam 30 to right pair of upper and lower secondary mirrors 52,54 to provide the LSH scan line. Then, at a final small angular segment of the half-cycle portion of each rotational cycle of device 36, each primary mirror 38A-D reflects the laser light beam 30 to the left pair of upper and lower secondary mirrors 56,58 to provide the RSH scan line (not shown). Specifically, at the initial angular segment of the half-cycle portion of each rotational cycle of device 36, each primary mirror 38A-D reflects the laser light beam 30 to the upper secondary mirror 52 of the right pair, wherefrom the laser light beam is then reflected to the lower secondary mirror 54. Then, subsequently at the final angular segment of the half-cycle portion of each rotational cycle, each primary mirror 38A-D reflects the laser light beam 30 to the upper secondary mirror 56 of the left pair, wherefrom the laser light beam is then reflected to the lower secondary mirror 58.

The secondary mirrors in the second plurality 46 thereof include an upper central secondary mirror 62 and a pair of outer secondary mirrors 64,66. The upper central secondary mirror 62 at its opposite right and left end portions 68,70 is disposed generally forwardly of the respective right and left pairs of upper and lower mirrors 52,54 and 56,58 of the first plurality 44. Also, the upper central secondary mirror 62 is disposed directly forwardly of and centered with the optical device 36. The right and left outer secondary mirrors 64,66 are disposed forwardly of the respective right and left pairs of upper and lower mirrors 52,54 and 56,58 of the first plurality 44, forwardly of and laterally outward from opposite right and left sides of the optical device 36, and adjacent to and extending generally below and inwardly from the respective right and left end portions 68,70 of the upper central secondary mirror 62. The upper central secondary mirror 62 is oriented about twenty-five degrees with respect to the vertical with its upper edge closer to the optical device 36 than its lower edge. The outer right and left secondary mirrors 64,66 are tilted in opposite fashion with respect to one another being farther apart at their upper than lower ends but with each mirror oriented at about forty-five degrees with respect to the vertical.

Figure 11:
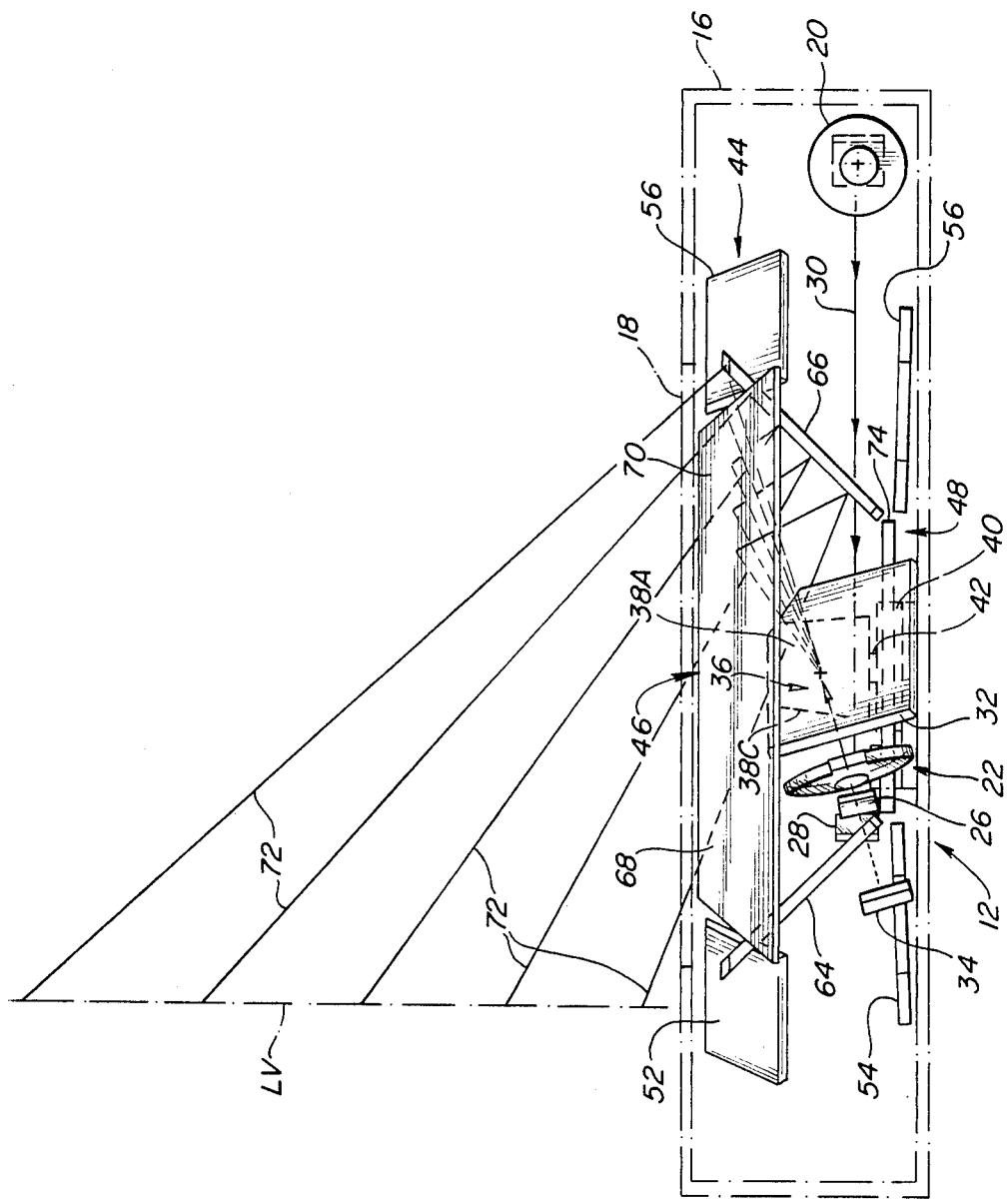
FIG. 11 is a schematic front elevational view similar to that of FIG. 8 also showing generation of vertical scan lines of the cross bar X pattern.

As shown in FIG. 11, the upper central secondary mirror 62 and the right and left outer secondary mirrors 64,66 are adapted to receive the laser light beam 30 reflected from each of the primary mirrors 38A–D and to reflect the same along V-shaped laser light beam path 72 through the upper window 18 of the scanner housing 16 to trace the pair of spaced apart right and left vertical (RV & LV) scan lines of the cross bar X laser light beam scan pattern as the primary mirrors 38A–D move successively through the aforementioned cycle portion of each rotational cycle of the optical device 36. Only generation of the LV scan line by the upper center secondary mirror 62 and right outer secondary mirror 66 is depicted in FIG. 11. More particularly, each primary mirror 38A–D at another small angular segment of the half-cycle portion of each rotational cycle of the optical device 36, reflects the laser light beam 30 to the right end portion 68 of the central secondary mirror 62, wherefrom the laser light beam is then reflected to the left outer secondary mirror 64 to provide the RV scan line. Subsequently, at still another small angular segment of the half-cycle portion of each rotational cycle which precedes immediately the aforementioned final small angular segment, each primary mirror 38A–D reflects the laser light beam 30 to the left end portion of the central secondary mirror 62, wherefrom the laser light beam is then reflected to the left outer secondary mirror 64 to provide the RV scan line.

The secondary mirrors in the third plurality 48 thereof include the upper central secondary mirror 62 of the second plurality 46 and a lower central secondary mirror 74. The lower central secondary mirror 74 is oriented in a horizontal plane and disposed between the lower ends of the respective left and right outer secondary mirrors 64,66 in the second plurality 46. The lower central secondary mirror 74 is also spaced between and below the upper central secondary mirror 62 and the optical device 36.

Figure 12:
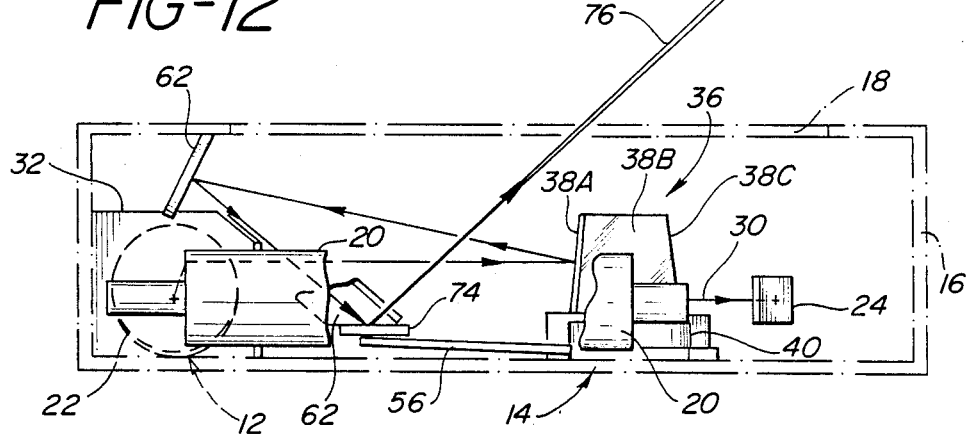
FIG. 12 is a schematic side elevational view similar to that of FIG. 9 also showing generation of the center horizontal scan line of the cross bar X pattern.

As shown in FIG. 12, the upper and lower central secondary mirrors 62,74 are adapted to receive the laser light beam 30 reflected from each of the primary mirrors 38A–D and to reflect the same along V-shaped laser light beam path 76 through the upper window 18 of the scanner housing 16 to trace the centerhorizontal (CH) scan line of the cross bar X laser light beam scan pattern as the primary mirrors 38A–D move successively through the aforementioned cycle portion of each rotational cycle of the optical device 36. More particularly, each primary mirror 38A–D at a middle segment of the cycle portion of each rotational cycle, being located between the other small angular segments of the half-cycle portion, reflects the laser light beam 30 to the upper central secondary mirror 62, wherefrom the laser light beam is then reflected to the lower central secondary mirror 74 to provide the CH scan line.

In view of the above-described layout of the first, second and third pluralities of secondary mirrors 44–48 relative to the primary mirrors 38A–D of the rotating optical device 36, it can be readily understood how the different scan lines of the cross bar X scan pattern can be generated at their different orientations as the laser light beam 30 is swept by each primary mirror across the secondary mirrors starting across the right upper secondary mirror 52, then across the upper central secondary mirror 62 from its right end portion 68 to right end portion 70, and finally across the left upper secondary mirror 56.

It will be appreciated that the laser scanner of the present invention includes an optical arrangement which permits the generation of an effective scan pattern by means of a scanner of minimum height. The reduction in size of the scanner of the present invention, consequently, facilitates the installation of a scanning system in locations at a point of sale station which were not heretofore possible, and at the same time enhances the appearance and user acceptance of the scanner system.

Having thus described the scan pattern generating arrangement of the present invention in detail and by reference to a preferred embodiment thereof, it will be apparent that modifications and variations are possible without departing from the scope of the invention defined in the appended claims.

What is claimed is:

1. In a laser scanner, an optical arrangement for generating a laser light beam scan pattern comprising:

an optical device mounted for movement repetitively through a rotational cycle about a generally upright axis and having a plurality of primary reflective elements oriented in angularly displaced relation from one to the next about said upright axis, each primary reflective element being adapted to receive and reflect a laser light beam as said primary reflective elements move successively through a portion of each rotational cycle of said optical device, each of said primary reflective elements being tilted relative to said upright axis so as to reflect said beam upward;

means for rotatably moving said optical device about said upright axis; and a multiplicity of secondary reflective elements being disposed in stationary positions relative to one another as said each primary reflective element moves through said rotational cycle portion, said secondary reflective elements being adapted to receive the laser light beam reflected from said primary reflective elements and to reflect the same initially downward and then upward to trace scan lines of the laser light beam scan pattern at different orientations with respect to one another as said primary reflective elements move successively through said portion of each rotational cycle.

2. The arrangement of claim 1 in which said multiplicity of secondary reflective elements includes a plurality of said secondary reflective elements being less in number than said multiplicity thereof and adapted to trace a pair of spaced apart side horizontal scan lines of said laser light beam scan pattern as said primary reflective elements move successively through said portion of each rotational cycle.

3. The arrangement of claim 2 in which said secondary reflective elements in said plurality thereof include:
a pair of upper and lower secondary reflective elements disposed forwardly of and laterally outward from each of a pair of opposite sides of said optical device;
said each primary reflective element at an initial segment of said portion of each rotational cycle reflecting the laser light beam to one of said pair of upper and lower secondary reflective elements to provide one of said side horizontal scan lines and at a final segment of said portion of each rotational cycle reflecting the laser light beam to the other of said pair of upper and lower secondary reflective elements to provide the other of said side horizontal scan lines.

4. The arrangement of claim 3 in which said each primary reflective element at said initial segment of said portion of each rotational cycle reflects the laser light beam to the upper one of said one pair of secondary reflective elements wherefrom the laser light beam is reflected to the lower one of said one pair and at said final segment of said portion of each rotational cycle reflects the laser light beam to the upper one of said other pair of secondary reflective elements wherefrom the laser light beam is reflected to the lower one of said other pair.

5. The arrangement of claim 1 in which said multiplicity of secondary reflective elements includes a plurality of said secondary reflective elements being less in number than said multiplicity thereof and adapted to trace a pair of spaced apart vertical scan lines of said laser light beam scan pattern as said primary reflective elements move successively through said portion of each rotational cycle.

6. The arrangement of claim 5 in which said secondary reflective elements in said plurality thereof include:
an upper central secondary reflective element being disposed forwardly of said optical device; and
a pair of outer secondary reflective elements each being disposed forwardly of and laterally outward from one of a pair of opposite sides of said optical device and adjacent to and extending generally below one of a pair of opposite end portions of said central secondary reflective element;
said each primary reflective element at an initial segment of said portion of each rotational cycle reflecting the laser light beam to one of said end portions of said central secondary reflective element wherefrom the laser light beam is reflected to one of said pair of outer secondary reflective elements to provide one of said vertical scan lines and at a final segment of said portion of each rotational cycle reflecting the laser light beam to the other of said end portions of said central secondary reflective element wherefrom the laser light beam is reflected to the other of said pair of outer secondary reflective elements to provide the other of said central scan lines.

7. The arrangement of claim 1 in which said multiplicity of secondary reflective elements includes a plurality of said secondary reflective elements being less in number than said multiplicity thereof and adapted to trace a center horizontal scan line of said laser light beam scan pattern as said primary reflective elements move successively through said portion of each rotational cycle.

8. The arrangement of claim 7 in which said secondary reflective elements in said plurality thereof include:
an upper central secondary reflective element being disposed forwardly of said optical device; and
a lower central secondary reflective element being spaced between and below said upper central secondary reflective element and said optical device;
said each primary reflective element at a middle segment of said portion of each rotational cycle reflecting the laser light beam to said upper central secondary reflective element wherefrom the laser light beam is reflected to said lower central secondary reflective element to provide said central horizontal scan line.

9. The arrangement of claim 1 in which said multiplicity of secondary reflective elements includes:
a first plurality of said secondary reflective elements being less in number than said multiplicity thereof and adapted to trace a pair of spaced apart vertical scan lines of said laser light beam scan pattern as said primary reflective elements move successively through said portion of each rotational cycle; and
a second plurality of said secondary reflective elements being less in number than said multiplicity thereof and adapted to trace a center horizontal scan line of said laser light beam scan pattern as said primary reflective elements move successively through said portion of each rotational cycle.

10. The arrangement of claim 9 in which said secondary reflective elements in said first plurality thereof include:
an upper central secondary reflective element being disposed forwardly of said optical device; and
a pair of outer secondary reflective elements each being disposed forwardly of and laterally outward from one of a pair of opposite sides of said optical device and adjacent to and extending generally below one of a pair of opposite end portions of said central secondary reflective element;
said each primary reflective element at an initial segment of said portion of each rotational cycle reflecting the laser light beam to one of said end portions of said central secondary reflective element wherefrom the laser light beam is reflected to one of said pair of outer secondary reflective elements to provide one of said vertical scan lines and at a final segment of said portion of each rotational cycle reflecting the laser light beam to the other of said end portions of said central secondary reflective element wherefrom the laser light beam is reflected to the other of said pair of outer secondary reflective elements to provide the other of said central scan lines.

11. The arrangement of claim 10 in which said secondary reflective elements in said second plurality thereof include:
said upper central secondary reflective element of said first plurality of secondary reflective elements; and
a lower central secondary reflective element being spaced between and below said upper central secondary reflective element and said optical device;

said each primary reflective element at a middle segment of said portion of each rotational cycle reflecting the laser light beam to said upper central secondary reflective element wherefrom the laser light beam is reflected to said lower central secondary reflective element to provide said central horizontal scan line.

12. In a laser scanner, an optical arrangement for generating a cross bar X laser light beam scan pattern comprising:
an optical device mounted for movement repetitively through a rotational cycle about a generally vertical axis and having a plurality of primary mirrors oriented in angularly displaced relation from one to the next about said vertical axis, each primary mirror being adapted to receive and reflect laser light as said primary mirrors move successively through a portion of each rotational cycle of said optical device, each of said primary mirrors being tilted relative to said vertical axis so as to reflect said laser light upward;
means for rotatably moving said optical device about said vertical axis;
a first plurality of secondary mirrors being disposed in stationary positions relative to one another and to each of said primary mirrors of said optical device as said primary mirrors move successively through said rotational cycle portion, said first plurality of secondary mirrors being adapted to receive laser light reflected from said primary mirrors and to reflect the same to trace a pair of spaced apart side horizontal scan lines of said laser light beam scan pattern as said primary mirrors move successively through said portion of each rotational cycle;
a second plurality of secondary mirrors being disposed in stationary positions relative to one another and to each of said primary mirrors of said optical device as said primary mirrors move successively through said rotational cycle portion, said second plurality of secondary mirrors being adapted to receive laser light reflected from said primary mirrors and to reflect the same to trace a pair of spaced apart vertical scan lines of said laser light beam scan pattern as said primary mirrors move successively through said portion of each rotational cycle; and
a third plurality of secondary mirrors being disposed in stationary positions relative to one another and to each of said primary mirrors of said optical device as said primary mirrors move successively through said rotational cycle portion, said third plurality of secondary mirrors being adapted to receive laser light reflected from said primary mirrors and to reflect the same to trace a horizontal scan line of said laser light beam scan pattern as said primary mirrors move successively through said portion of each rotational cycle, said laser light being initially reflected downward and then reflected upward by said first, second and third pluralities of said secondary mirrors prior to tracing said scan lines.

13. The arrangement of claim 12 in which said primary mirrors are tilted relative to said vertical axis so as to be spaced closer to one another at their respective upper ends than at their respective lower ends.

14. The arrangement of claim 12 in which said secondary mirrors in said first plurality thereof include:

a pair of upper and lower secondary mirrors disposed forwardly of and laterally outward from each of a pair of opposite sides of said optical device;
said each primary mirror at an initial segment of said portion of each rotational cycle reflecting the laser light beam to one of said pair of upper and lower secondary mirrors to provide one of said side horizontal scan lines and at a final segment of said portion of each rotational cycle reflecting the laser light beam to the other of said pair of upper and lower secondary mirrors to provide the other of said side horizontal scan lines.

15. The arrangement of claim 14 in which said each primary mirror at said initial segment of said portion of each rotational cycle reflects the laser light beam to the upper one of said one pair of secondary mirrors wherefrom the laser light beam is reflected to the lower one of said one pair and at said final segment of said portion of each rotational cycle reflects the laser light beam to the upper one of said other pair of secondary mirrors wherefrom the laser light beam is reflected to the lower one of said other pair.

16. The arrangement of claim 14 in which said secondary mirrors in said second plurality thereof include:
an upper central secondary mirror being disposed forwardly of said pairs of upper and lower mirrors of said first plurality and forwardly of said optical device; and
a pair of outer secondary mirrors each being disposed forwardly of said respective pairs of upper and lower mirrors of said first plurality, forwardly of and laterally outward from one of a pair of opposite sides of said optical device and adjacent to and extending generally below one of a pair of opposite end portions of said central secondary mirror;
said each primary mirror at an initial segment of said portion of each rotational cycle reflecting the laser light beam to one of said end portions of said central secondary mirror wherefrom the laser light beam is reflected to one of said pair of outer secondary mirrors to provide one of said vertical scan lines and at a final segment of said portion of each rotational cycle reflecting the laser light beam to the other of said end portions of said central secondary mirror wherefrom the laser light beam is reflected to the other of said pair of outer secondary mirrors to provide the other of said central scan lines.

17. The arrangement of claim 16 in which said secondary mirrors in said third pluralilty thereof include;
said upper central secondary mirror of said second plurality of secondary mirrors; and
a lower central secondary mirror being disposed between lower ends of respective outer secondary mirrors in said pair thereof in said second plurality of secondary mirrors, said lower central secondary mirror being spaced between and below said upper central secondary mirror and said optical device;
said each primary mirror at a middle segment of said portion of each rotational cycle reflecting the laser light beam to said upper central secondary mirror wherefrom the laser light beam is reflected to said lower central secondary mirror to provide said central horizontal scan line.

18. In a compact laser scanner of relatively minimal overall height, an optical arrangement for generating a laser light beam scan pattern including a plurality of scan lines, comprising:

an optical device mounted for movement repetitively through a rotational cycle about a generally upright axis and having a plurality of primary reflective elements positioned about said axis, each such primary reflective element being adapted to receive and reflect a laser light beam as said primary reflective elements move successively through a portion of each rotational cycle of said optical device, each of said primary reflective elements being tilted relative to said upright axis so as to reflect said beam upward;

means for rotating said optical device about said upright axis; and a plurality of secondary reflective elements being disposed in stationary positions with respect to each other and to said axis, said secondary reflective elements being positioned such that each scan line of said light beam scan pattern is produced by reflection of said beam initially downward and then upward by a unique set of two of said secondary mirrors.

* * * * *